United States Patent [19]

Saxe

[11] Patent Number: 4,772,103
[45] Date of Patent: Sep. 20, 1988

[54] LIGHT VALVE CONTAINING AN IMPROVED SUSPENSION, AND LIQUIDS THEREFOR

[75] Inventor: Robert L. Saxe, New York, N.Y.

[73] Assignee: Research Frontiers Incorporated, Woodbury, N.Y.

[21] Appl. No.: 894,932

[22] Filed: Aug. 8, 1986

Related U.S. Application Data

[63] Continuation-in-part of Ser. No. 742,803, Jun. 10, 1985, abandoned.

[51] Int. Cl.$^4$ .......................... G02B 5/30; G02B 7/12
[52] U.S. Cl. ..................................... 350/362; 252/585
[58] Field of Search ............... 350/267, 362; 252/585, 252/582

[56] References Cited

U.S. PATENT DOCUMENTS

| | | | |
|---|---|---|---|
| 1,955,923 | 4/1934 | Land | 350/362 |
| 2,220,111 | 11/1940 | Marks | 252/585 X |
| 3,395,986 | 8/1968 | Gruber | 252/582 X |
| 3,511,660 | 5/1970 | Stevens et al. | 252/582 X |
| 3,841,732 | 10/1974 | Marks | 350/267 |
| 4,407,565 | 10/1983 | Saxe | 252/582 X |
| 4,442,019 | 4/1984 | Marks | 350/362 X |

Primary Examiner—Matthew A. Thexton
Assistant Examiner—Catherine S. Kilby
Attorney, Agent, or Firm—Jacobs & Jacobs

[57] ABSTRACT

In a light valve, comprising a cell containing a suspension of small anisometrically shaped particles suspended in an electrically resistive liquid suspending medium, said liquid suspending medium having a polymer dissolved therein and bonded to or associated with said particles, the improvement wherein said liquid suspending material comprises a liquid ester or ether of the formula $$R^1-X-R^2$$

wherein $R^1$ and $R^2$ are as defined herein and X is

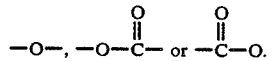

9 Claims, No Drawings

LIGHT VALVE CONTAINING AN IMPROVED SUSPENSION, AND LIQUIDS THEREFOR

This is a continuation-in-part of my copending application Ser. No. 742,803, filed June 10, 1985, now abandoned.

The present invention relates to light valves and more particularly to improvements in the liquid suspension of particles contained or adapted to be contained within the light valve cell. Still more particularly, the present invention relates to liquids which may be included in such a liquid suspension of particles.

Light valves have been known for more than fifty years for modulation of light. In Edwin Land's U.S. Pat. No. 1,955,923 the light valve was defined as a cell formed of two transparent sheets of insulating material spaced apart a small distance and containing a suspension of small particles in a liquid suspending medium. As a practical matter, the suspension also includes a polymeric stabilizer dissolved in the liquid suspending medium to prevent agglomeration of the particles. Nitrocellulose was proposed as a polymeric stabilizer in the beginning of the development of light valves. More recently, U.S. Pat. Nos. 4,164,365 and 4,273,422 disclosed polymeric stabilizers in the form of copolymers or a mixture of polymers.

In the absence of an applied electrical field, the particles in the liquid suspension exhibit random Brownian movement, and hence a beam of light passing into the cell is reflected, transmitted or absorbed, depending upon the nature and concentration of the particles and the energy content of the light. When an electrical field is applied through the suspension in the light valve, the particles become aligned and for many suspensions a substantial part of the light can pass through the cell.

Light valves have been extensively described in the literature. See U.S. Pat. Nos. 1,955,923, 1,963,496, 3,512,876 and 3,773,684. In the early days of television, Donal, Lagmuir and Goldmark thoroughly investigated the use of light valves in black and white as well as color television. See U.S. Pat. Nos. 2,290,582, 2,481,621, 2,528,510 and 2,645,976. A more modern use of the light valve is as an alpha-numeric display. Also, active matrix addressed high information content light valve displays including flat color television set replacements for the cathode ray tube have been proposed by the assignee of the present invention. Such displays could function in a manner partly analogous to commercially available flat color TV sets which use liquid crystals to produce images. Light valves have also been proposed for use in windows, eye-glasses and the like to control the amount of sunlight passing therethrough.

A wide variety of organic and inorganic particles have been proposed for use in light valves including mica, graphite, numerous metals, and halogen-containing lightpolarizing crystals including, for example, certain metal halides and perhalides of alkaloid acid salts. Likewise, a wide variety of liquids have been suggested as all or part of the light valve liquid suspending medium to suspend the small particlesand dissolve the polymeric stabilizer, such as certain esters, nitrobenzene, oils and other liquids. See U.S. Pat. Nos. 1,961,664, 2,290,582 and others.

Isopentyl acetate and isopentyl isobutyrate have been proposed for use as a suspending liquid in a light valve in U.S. Pat. 4,442,019 to Marks. The suspending liquids of the present invention have markedly improved stability over the esters proposed by Marks.

Dibutyl phthalate has been proposed for use as a suspending liquid in a light valve in U.S. Pat. Nos. 1,951,664 and 1,955,923 to Land and 3,625,869 to Marks. U.S. Pat. Nos. 4,025,163 and 4,113,362 to Saxe et al. propose the use of aromatic esters derived by reaction between an aromatic alcohol and an aliphatic acid.

U.S. Pat. No. 4,407,565 proposed to bring a light valve suspension into substantial gravitational equilibrium by using as the liquid suspending medium therefor an electrically resistive, inert, low molecular weight, liquid fluorocarbon polymer having a specific gravity at room temperature of at least about 1.5 and having at least about 50% of its atoms constituted by halogen atoms, at least 60% of said halogen atoms being fluorine and the balance chlorine and/or bromine, and an electrically resistive organic liquid miscible therewith. A wide variety of organic liquids can be used as the aforesaid miscible organic liquid. These include esters of aliphatic and aromatic acids and alcohols, e.g., alkyl acetates, such as isopentyl acetate and alkylphenyl acetates, such as p-nonylphenyl acetate, dioctylphthalate, diisodecyl adipate, dioctyl sebacate, as well as aromatic hydrocarbons, e.g., benzene and toluene, and silicones.

The choice of the miscible organic liquid is important. Its boiling point should preferably be well above 100° C. so as to keep its vapor pressure relatively low in the normal operating temperature range for a light valve, which might be −40° C. to +85° C.

The liquid should also have a very high electrical resistivity, preferably at least $10^{11}$ ohm-cm and more preferably $10^{12}$ ohm-cm or higher. The higher its electrical resistivity, the lower the voltage required to orient the suspended particles and the lower the power losses in the suspension.

For many purposes, for example suspensions for use in displays, rapid response time is important. Because response time is related to the suspension viscosity, the lower the viscosity of the liquid, the better when fast speed of response is desired.

Finally, the liquid should be compatible with other materials in the suspension and not degrade or be degraded by them or any of the cell components.

The present invention provides liquids for use in the suspending medium of a light valve that meet these criteria. In particular, the present invention provides a light valve in which the liquid suspending medium comprises a liquid ester or ether of formula (I):

$$R^1-X-R^2 \quad (I)$$

wherein $R^1$ is branched chain alkyl of at least 8 carbon atoms, such as from 8 to about 20 carbon atoms, or the group (III)

wherein Y and Z are independently a direct bond or straight or branched chain alkylene, such as from 1 to 8 carbon atoms, and $R^3$ and $R^4$ are lower alkyl, such as from 1 to 6, preferably 1 to 3,carbon atoms, $R^2$ is branched chain alkyl or cycloalkyl, such as from 3 to about 20 carbon atoms; and X is

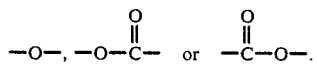

Preferably, $R^1$ and $R^2$ contain from 3 to about 12 carbon atoms. Suitably, Y is straight or branched chain alkylene of from 1 to about 6 carbon atoms and Z is a direct bond.

Embraced within formula (I) are the presently preferred esters and ethers:

$$R^5-X-R^6 \qquad (II)$$

wherein $R^5$ is tertiary butyl, neopentyl, 2-ethylhexyl or 3,5,5-trimethylhexyl, and $R^4$ is isopropyl, tertiary butyl, 2-ethylhexyl, 3,5,5-trimethylhexyl or neopentyl.

The liquids used in the present invention are branched low polarity monoesters and monoethers in which the ester or ether linkage, as the case may be, is at least partially sterically hindered on both sides of the linkage with suitable groups, preferably branched alkyl of 3 to 12 carbon atoms. The aforesaid criteria of low polarity and hindrance of the linkage serve to reduce or eliminate any tendency of the liquid: (a) to desorb polymer from particles suspended in a light valve suspension or (b) in suspensions which employ a first polymer bonded to the suspended particles and a second polymer bonded to or associated with the first polymer, to weaken or destroy the bond or association between said first and second polymers. Any such desorption and/or weakening or destruction of interpolymer bonds or associations will usually reduce the physical stability of the suspension and can often cause agglomeration and/or precipitation of the suspended particles.

The steric hindrance of the ester or ether also prevents oxidation reactions between the oxygen of the ester or ether and the particles, a problem that prior art esters and ethers frequently caused when polyiodide particles were suspended in the suspension.

Thus, the presence of the liquids used in the present invention in a light valve suspension does not chemically or physically degrade the quality of the suspension, as prior art liquids often did.

The liquids used in the present invention can have a wide range of boiling points and freezing points. However, the boiling point is generally above 150° C. and preferably above 175° C. The freezing point is usually below 22° C. and preferably below −40° C.

The viscosity of the liquids of the present invention can likewise vary substantially but where fast responding suspensions are desired, should preferably be 25 cps or less at room temperature.

When a liquid of the present invention is used in a light valve suspension which employs only one type of polymer, it should preferably be a solvent for said polymer. When used in a light valve suspension which employs two polymers as described above, it should preferably be a solvent for the second polymer.

Examples of liquid esters of the present invention include 3,5,5-trimethylhexyl isobutyrate, 3,5,5-trimethylhexyl neopentanoate and neopentyl neopentanoate. Electrical resistivities of these three liquids are respectively about $3.8 \times 10^{11}$ ohm-cm (undistilled), $1.2 \times 10^{12}$ ohm-cm (distilled), and $2.8 \times 10^{11}$ ohm-cm (distilled).

Examples of liquid ethers of the present invention include di-2-ethylhexyl ether, di-3,5,5-trimethylhexyl ether and dineopentyl ether. Non-symmetrical branched ethers are also useable.

Where low viscosity is especially important, the ethers have an advantage over the corresponding esters. For example, it is known from the prior art that the viscosity of benzyl benzoate at 25° C. is 8.292 cps whereas the viscosity of dibenzyl ether at 20° C. is 5.333 cps. Also, the viscosity of ethyl acetate at 15° C. is 0.473 cps whereas the viscosity of diethyl ether at 15° C. is 0.247 cps. Assuming that this well-known relationship remains valid for the branched esters and ethers of the present invention, one may predict a lower viscosity for a branched ether than for the corresponding ester. A reason why this may be true is that in general an ester linkage is relatively inflexible compared to an ether linkage.

The use of the liquids of the present invention in suspensions for light valves is described in the following Examples:

EXAMPLE 1

Formulation For Making A Paste Of Crystals Of Dihydrocinchonidine Sulfate Periodide (DCSI)

A typical formulation which can be used to prepare colloidal particles of dihydrocinchonidine sulfate periodide is as follows:

Solution A

A solution consisting of:

| | |
|---|---|
| 0.65 gm. | cesium iodide (CsI) |
| 2.48 gm. | dihydrocinchonidine sulfate (DCS) |
| 10.00 gm. | 2-ethoxyethanol |
| 5.00 gm. | H₂O |
| 3.00 gm. | methanol | is combined with

| | |
|---|---|
| 22.00 gm. | of a 33⅓ solution of nitrocellulose in 2-ethyoxyethanol. The nitrocellulose should be a mixture of low viscosity (18.6 cps) and high viscosity (15 seconds) types, 50% each. |

Solution B

| | |
|---|---|
| 3.00 gm. | chloroform |
| 10.00 gm. | n-propanol |
| 1.38 gm. | I₂ |
| 22.00 gm. | Tricresylphosphate |

Shake well for 15 minutes.

Pour solution A into a plastic blender cup and add Solution B while blender is at high speed. In 3–5 minutes product will form having a deep blue color in a gel-like wet paste.

The resulting wet paste should be spread on a glass plate at an 8 mil thickness and allowed to dry at room temperature for at least one hour.

The unsulfated starting material for the aforesaid reaction, dihydrocinchonidine alkaloid (sometimes called hydrocinchonidine) is commercially available. The alkaloid material is then sulfated by dissolving it in a mixture of 1.5 parts of methanol and 0.32 parts of 97% H₂SO₄ and then evaporating to dryness. The resulting dihydrocinchonidine sulfate is in the form of a light tan colored powder.

Procedure for Processing a DCSI Paste

1. In a suitable jar, place the dried paste which has been prepared in accordance with the method described in Example 1. Add isopentyl acetate (IPA) and hexanes so that the final percentage totals will be:

| Paste | 11% |
|---|---|
| IPA | 59% |
| Hexanes | 30% |

Shake the above mixture for about 15 minutes and then place the jar into an ultrasonic generator for 10 hours.

2. After ultrasonicing, centrifuge the jar contents for eight hours at 2,500 RPM and discard the supernatant.

3. Spread the sediments from the centrifuge tubes onto a glass plate and record the weight. Hereafter these sediments will be called SMP (Solvent Moist Paste).

4. Add to the SMP one-eighth (⅛) the amount of SMP by weight of dioctyl adipate (DOA), and dry off at room temperature the remaining IPA in the SMP.

5. Grind the paste materials for 20 to 30 seconds. Collect the ground paste material and add enough IPA to form a suspension. This suspension is then rapidly stirred for one hour. After stirring, ultrasonically agitate for another ten hours.

6. Centrifuge the ultrasoniced material for one-half (½) hour and save the supernatant.

7. Centrifuge the supernatant material for ten hours and pour its supernatant off, leaving only the sediment. The sediment (or SMP) is then resuspended one part SMP and four parts isopentyl acetate.

8. After thoroughly mixing, ultrasonic suspension for ten hours.

9. Add to the above suspension enough dioctyl adipate so that for each 2.6 gms. of solid paste material, there will be 7.4 gms. of DOA. The isopentyl acetate should now be vacuumed off leaving only a 26% paste/DOA concentrate. This concentrate is now ready to be dispersed in the final suspending medium.

Dispersion Into The Final Suspending Medium

10. A copolymer consisting of 97% neopentyl acrylate/3% methylol acrylamide (NPA-MOAM), by weight, and having a molecular weight of approximately 25,000 is dissolved in dioctyl adipate, neopentyl neopentanoate or type 0.8 Halocarbon Oil in the following weight percentages to form three solutions:

| Dioctyl adipate/NPA-MOAM | 50/50% |
|---|---|
| Neopentyl neopentanoate/NPA-MOAM | 75/25% |
| Type 0.8 Halocarbon Oil/NPA-MOAM | 85/15% |

To reduce their viscosity, the above solutions are ultrasoniced for at least 50 hours.

11. The dilution factor for a concentrate depends upon the cell spacing and whether the material is to be used in a transmissive, transflective or reflective mode. I have found that much less copolymer is needed to stabilize a suspension which has a relatively high percentage of paste, and that preferably such paste percentage should be at least 2.6%. To take advantage of this information and to also avoid too dark an off-state for the suspension, as well as to minimize the voltage needed to activate the suspension in a light valve, the cell spacing should preferably be 2-mils or less.

12. Using the DOA/NPA-MOAM 50/50% solution, add enough to the concentrate so that the final dilution result will show 2.6% paste and 10% for DOA. Be sure to mix well. To this is added the 75/25% Neopentyl neopentanoate/NPA-MOAM so that the final dilution result will show 10% for neopentyl neopentanoate. Mix well. The 15/85% Halocarbon Oil/NPA-MOAM solution should now be added and mixed in well. The amount of this solution is determined by the total percentagr of copolymer needed in the final suspension. Halocarbon Oil alone is now added to bring the total percentage up to 100%. The final suspension is now ultrasoniced for at least one hour.

| Final Suspension Percentages For A Cell Having A Distance Of 2-mils Between Its Electrodes | |
|---|---|
| Paste | 2.6% |
| NPA-MOAM Polymer | 15.0 |
| DOA | 10.0 |
| Neopentyl neopentanoate | 10.0 |
| 0.8 Halocarbon Oil | 62.4 |
| | 100.0% |

Type 0.8 Halocarbon Oil is described in Saxe, U.S. Pat. No. 4,407,565.

EXAMPLE 2-7

Example 1 is repeated in each case except that the neopentyl neopentanoate is replaced: (a) in Example 2 with 3,5,5-trimethylhexyl isobutyrate (b) in Example 3 with 3,5,5-trimethylhexyl neopentanoate (c) in Example 4 with dineopentyl ether (d) in Example 5 with di-3,5,5-trimethylhexyl ether; (e) in Example 6 with di-2-ethylhexyl ether, and (f) in Example 7 with isobutyl neopentanoate.

EXAMPLE 8

Liquid suspending media used in the present invention were compared to isopentyl acetate and isopentyl isobutyrate as follows.

The procedure of Example 1 was followed to prepare five suspensions of DCSI in the candidate liquid, with the following modifications. In step 9, the amount of dioctyl adipate was 7.0 grams. In step 10, the NPA-MOAM copolymer was added to the candidate liquid suspending medium and in step 12 the concentrate from step 9 is mixed with the NPA-MOAM copolymer/candidate liquid. No halocarbon oil was used in order to provide a direct comparison between the five suspending liquids tested. The final suspensions contained:

| | PERCENT |
|---|---|
| DCSI paste | 2.6 |
| NPA-MOAM Polymer | 12.0 |
| DOA | 7.0 |
| Candidate liquid | 78.4 |

The candidate liquids were neopentyl neopentanoate (Example 1), 3,5,5-trimethylhexyl isobutyrate (Example 2) and isobutyl neopentanoate (Example 7) according to the present invention, and isopentyl acetate and isopentyl isobutyrate according to Marks U.S. Pat. No. 4,442,019.

Each of the final suspensions was subjected to accelerated aging by storage at 85° C. for 66 hours. The properties of the suspensions were measured after storage. The results of the tests are reported below:

| Properties Of Suspensions Before and After Storage At 85° C. for 66 Hours | | | | | | |
|---|---|---|---|---|---|---|
| Liquid Suspending Medium | Color of Suspension | | Optical Density (Off) | | Optical Density Ratio (OFF/ON) | |
| | Before | After | Before | After | Before | After |
| Example 1 | Blue | Blue | 3.0 | 3.0 | 1.3 | 1.3 |
| Example 2 | Blue | Blue | 3.3 | 3.1 | 1.3 | 1.2 |
| Example 7 | Blue | Blue | 2.4 | 2.4 | 1.25 | 1.2 |
| Isopentyl acetate | Blue | Amber | 2.0 | <0.6 | 1.3 | 1.0 |
| Isopentyl isobutyrate | Blue | Yellow | 2.0 | <0.6 | 1.3 | 1.0 |

After storage, the prior art suspensions changed color, which indicates that degradation products had formed. However, the suspensions according to the invention did not degrade and showed no change in color.

The optical density of each suspension was measured at a field strength of approximately 11 volts/mil RMS (ON) and at no applied voltage (OFF), and the ratio of optical densities at the OFF and ON states was calculated.

All five suspensions functioned satisfactorily before storage at 85° C. for 66 hours, but after storage the two prior art suspensions had degraded, as seen by comparing their optical density and optical density ratio before and after storage. Indeed, an optical density ratio of 1.0, after storage, for the prior art suspensions means that there is no significant change in the optical density of the suspension between the ON and OFF states, and hence the prior art suspensions, after storage, had degraded to the point where they were inoperative as light valve suspensions.

In contrast, the suspensions prepared according to the present invention showed no significant change in their excellent optical densities or optical density ratios after storage. These data demonstrate the superior stability of the liquid suspending media used in the present invention.

While specific embodiments of my invention have been illustrated, it will be appreciated that the invention is not limited thereto, since many modifications may be made by one skilled in the art which fall within the true spirit and scope of the invention.

I claim:

1. In a light valve, comprising a cell containing a suspension of small anisometrically shaped particles suspended in an electrically resistive liquid suspending medium, said liquid suspending medium having a polymer dissolved therein and bonded to or associated with said particles, the improvement wherein said liquid suspending material comprises a liquid ester or ether of the formula

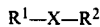

wherein $R^1$ is branched chain alkyl of at least 8 carbon atoms or the group (III)

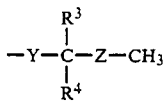

wherein Y and Z are independently a direct bond or straight or branched chain alkylene and $R^3$ and $R^4$ are lower alkyl; $R^2$ is branched chain alkyl or cycloalkyl; and X is

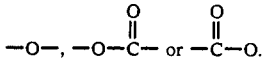

2. The light valve according to claim 1, wherein $R^1$ and $R^2$ each have up to about 20 carbon atoms.

3. The light valve according to claim 1, wherein $R^1$ is tertiary butyl, neopentyl, 2-ethylhexyl or 3,5,5-trimethylhexyl and $R^2$ is isopropyl, tertiary butyl, 2-ethylhexyl, 3,5,5-trimethylhexyl or neopentyl.

4. The light valve according to claim 1, wherein said liquid suspending material comprises di-2-ethylhexyl ether, di-3,5,5-trimethylhexyl ether, di-neopentyl ether, 3,5,5-trimethylhexyl isobutyrate, 3,5,5-trimethylhexyl neopentanoate, neopentyl neopentanoate or isobutyl neopentanoate.

5. The light valve according to claim 1, wherein said liquid suspending medium also comprises an electrically resistive, chemically inert, low-molecular weight, liquid fluorocarbon polymer having a specific gravity at room temperature of at least about 1.5 and having at least about 50% of its atoms constituted by halogen atoms, at least 60% of said halogen atoms being fluorine and the balance chlorine and/or bromine.

6. The light valve according to claim 1, wherein $R^3$ and $R^4$ are each methyl, Y is straight or branched chain alkylene of from 1 to about 6 carbon atoms and Z is a direct bond.

7. In a light valve, comprising a cell containing a suspension of small anisometrically shaped particles suspended in an electrically resistive liquid suspending medium, said liquid suspending medium having a polymer dissolved therein and bonded to or associated with said particles, the improvement wherein said liquid suspending medium comprises neopentyl neopentanoate, 3,5,5-trimethylhexyisobutyrate or isobutyl neopentanoate.

8. The light valve according to claim 7, wherein said liquid suspending medium also comprises an electrically resistive, chemically insert, low-molecular weight, liquid fluorocarbon polymer having a specific gravity at room temperature of at least about 1.5 and having at least about 50% of its atoms constituted by halogen atoms, at least 60% of said halogen atoms being fluorine and the balance chlorine and/or bromine.

9. The light valve according to claim 7, wherein said liquid suspending medium comprises neopentyl neopentanoate.

* * * * *